United States Patent
Ju et al.

(10) Patent No.: US 6,779,108 B2
(45) Date of Patent: Aug. 17, 2004

(54) INCORPORATING TRIGGER LOADS IN BRANCH HISTORIES FOR BRANCH PREDICTION

(75) Inventors: Dz-ching Ju, Sunnyvale, CA (US); Srikanth T. Srinivasan, Durham, NC (US); Christopher B. Wilkerson, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 614 days.

(21) Appl. No.: 09/738,115

(22) Filed: Dec. 15, 2000

(65) Prior Publication Data

US 2002/0078331 A1 Jun. 20, 2002

(51) Int. Cl.[7] ............................................... G06F 9/00
(52) U.S. Cl. ...................................... 712/239; 712/219
(58) Field of Search ................................. 712/239, 219

(56) References Cited

U.S. PATENT DOCUMENTS 3,577,189 A * 5/1971 Cocke ........................ 712/219
5,884,059 A * 3/1999 Favor et al. ................. 712/215
6,272,623 B1 * 8/2001 Talcott ........................ 712/239
6,367,076 B1 * 4/2002 Imai et al. ................... 717/152
6,377,942 B1 * 4/2002 Hinsley et al. ................ 707/1

OTHER PUBLICATIONS

Srikanth T. Srinivasan and Alvin R. Lebeck, "Exploiting Load Latency Tolerance in Dynamically Scheduled Processors," Feb. 13, 1998, pp. 1–18.

Timothy H. Heil, Zak Smith and J.E. Smith, "Improving Branch Predictors by Correlating on Data Values," Nov. 1999, pp. 28–37.

* cited by examiner

*Primary Examiner*—Eddie Chan
*Assistant Examiner*—Charles Harkness
(74) *Attorney, Agent, or Firm*—Marger Johnson & McCollom (57) ABSTRACT

To make a branch prediction, a branch prediction apparatus determines a trigger load instruction whose value feeds into the branch instruction. A hash value is associated with the branch instruction. The branch prediction apparatus computes the hash value based on the trigger load instruction. If the hash value has not changed, the branch prediction apparatus predicts the branch to be chosen based on past predictions for the hash value.

37 Claims, 8 Drawing Sheets

INCORPORATING TRIGGER LOADS IN BRANCH HISTORIES FOR BRANCH PREDICTION

FIELD OF THE INVENTION

This invention pertains to branch predictions in a computer, and more particularly to branch predictions based on load instructions.

BACKGROUND OF THE INVENTION

Figure 1:
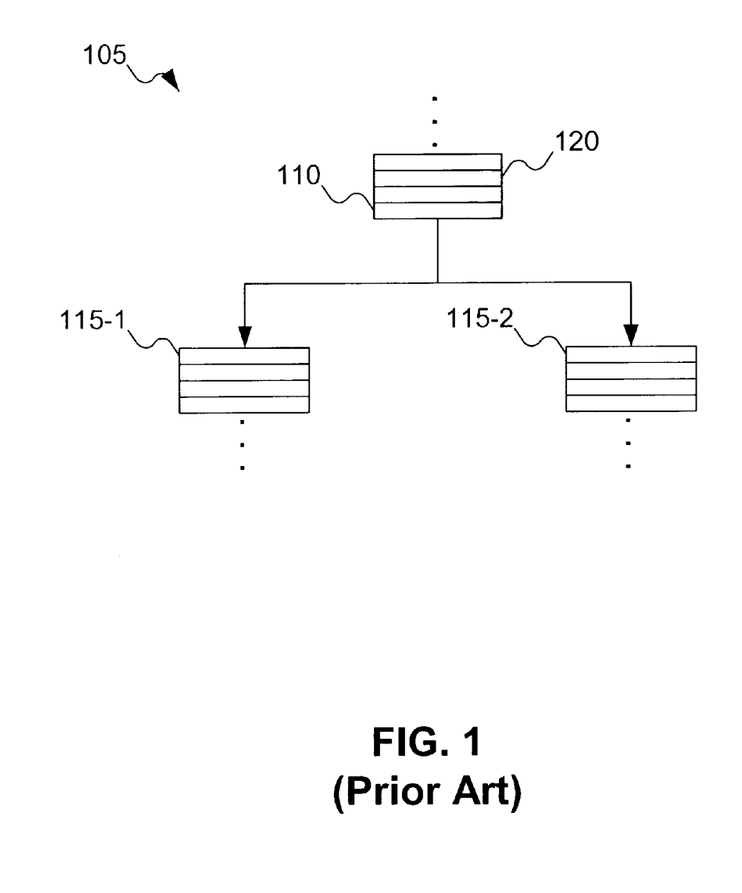
FIG. 1 shows a program including a branch instruction.

In an effort to improve processor efficiency, computers today engage in branch prediction. Branch prediction involves speculating as to which way a program will go when it reaches a branch point. For example, FIG. 1 shows program 105 with branch instruction 110. At the branch, the program will proceed either with instruction 115-1 or instruction 115-2, depending on whether or not the branch is taken. The processor attempts to determine which path will be followed: i.e., whether instruction 115-1 or instruction 115-2 will follow instruction 110. When successful, branch prediction enables processors, especially pipeline processors (which execute several instructions at different stages at the same time), to execute programs more quickly.

But when a branch prediction fails, any instructions executed by the processor on the wrong path have been wasted. The processor loses any advantage provided by the branch predictor, and needs to execute the instructions along the correct path.

Frequently, the branch taken after a branch instruction correlates well with data recently loaded from memory. For example, in FIG. 1, instruction 120 may be a load instruction, on whose value branch instruction 110 depends. But currently, branch prediction is based on factors such as the path leading to the branch, previous occurrences of the branch, and the values of operands of the branch instruction. Branch prediction, so far, does not correlate with the value of data loaded from memory.

The present invention addresses this and other problems associated with the prior art.

DETAILED DESCRIPTION

Figure 2:
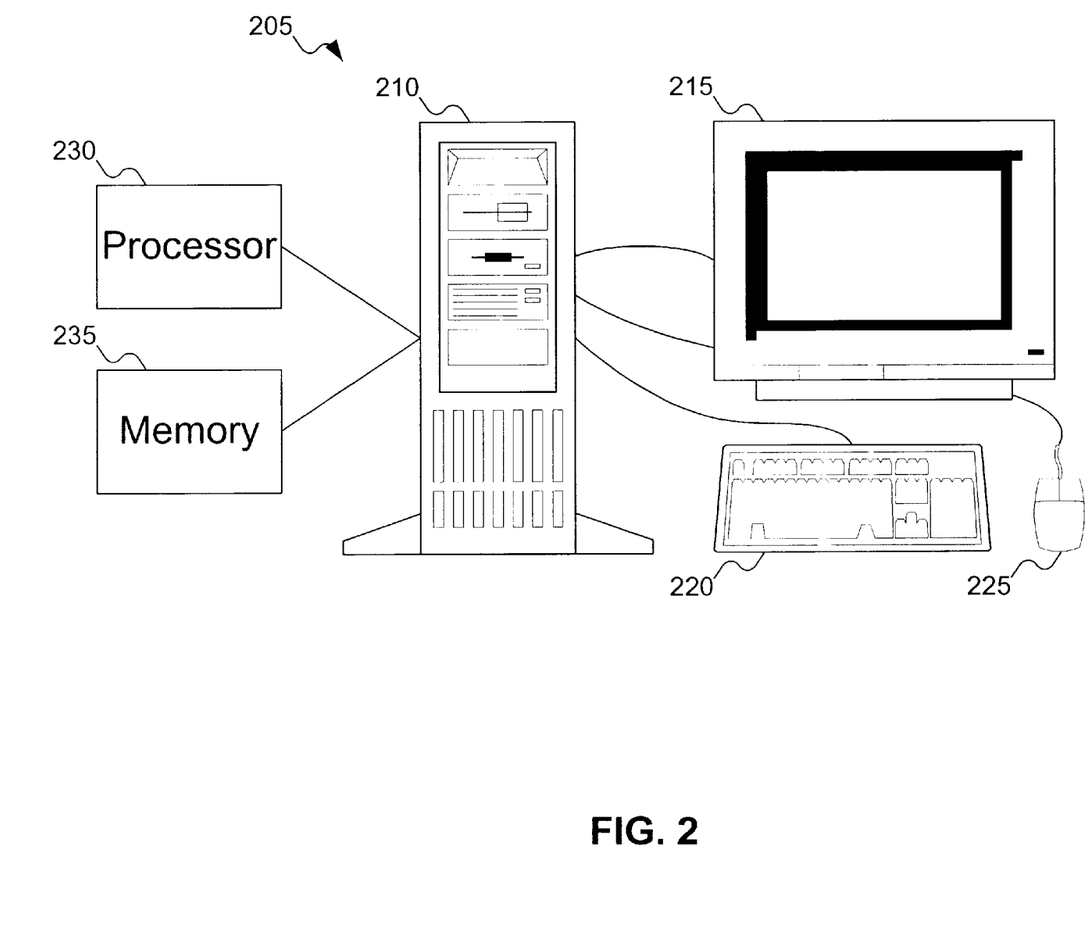
FIG. 2 shows a computer system that may perform branch prediction based on load instructions.

FIG. 2 shows a computer system 205 in accordance with the invention. Computer system 205 includes a computer 210, a monitor 215, a keyboard 220, and a mouse 225. Computer 210 includes hardware components, such as a processor 105, a memory 230, and a branch prediction apparatus (not shown). Computer system 205 may also include other equipment not shown in FIG. 2, for example, other input/output equipment or a printer.

Figure 3:
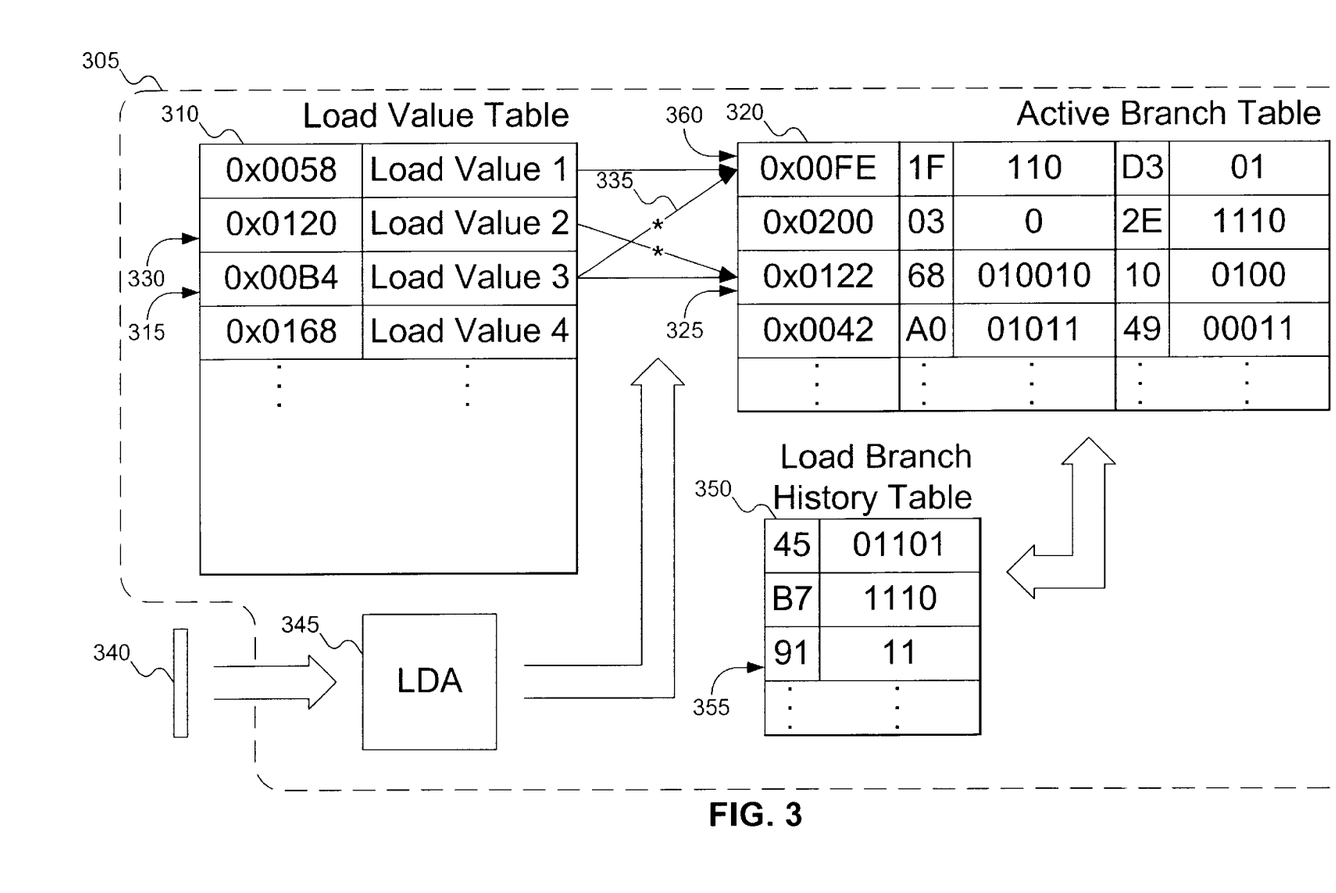
FIG. 3 shows a branch prediction apparatus operable on the computer system of FIG. 2.
Figure 4A:
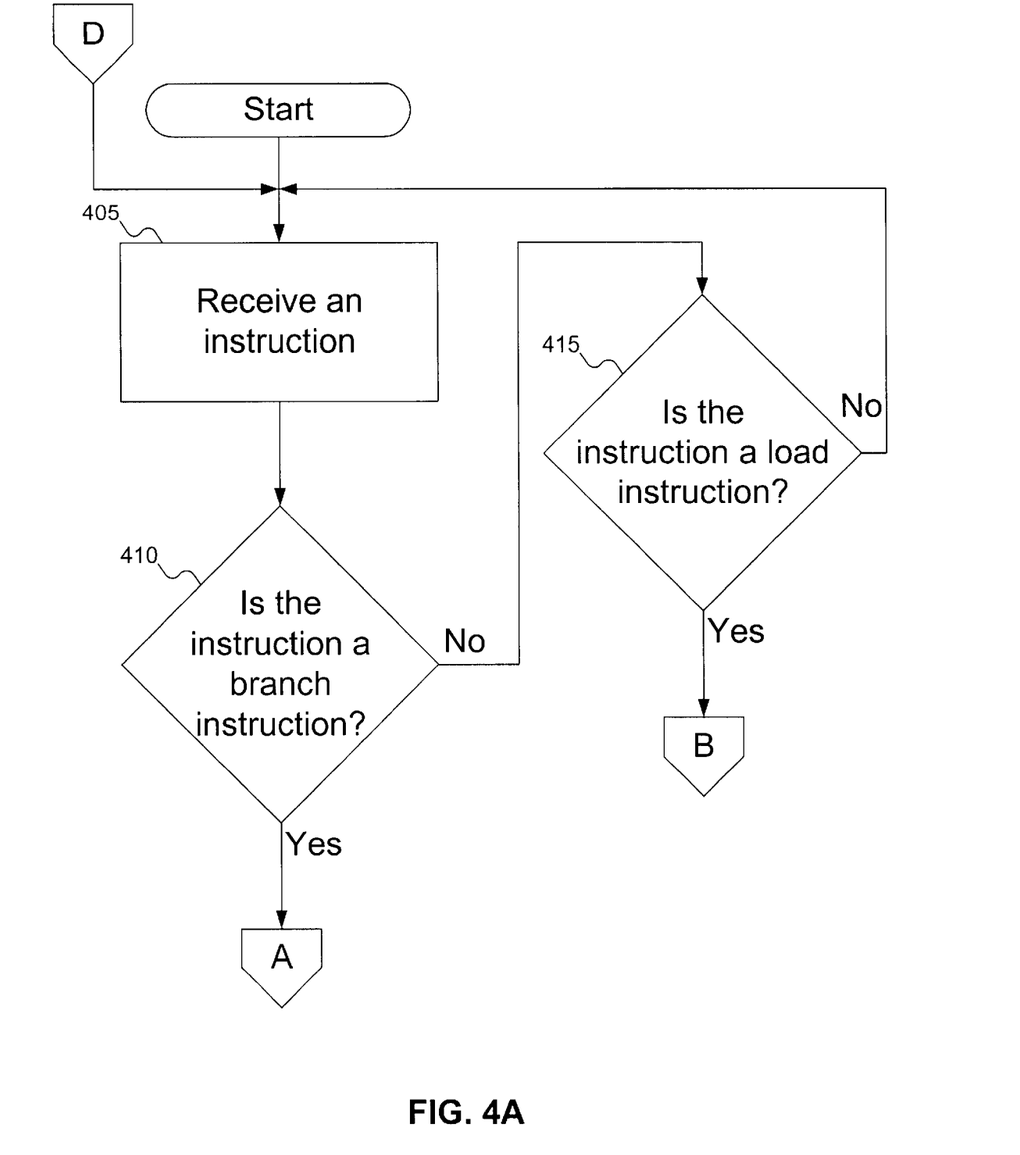
FIGS. 4A–4D show the procedure used by the branch apparatus of FIG. 3 to perform branch prediction.
Figure 4B:
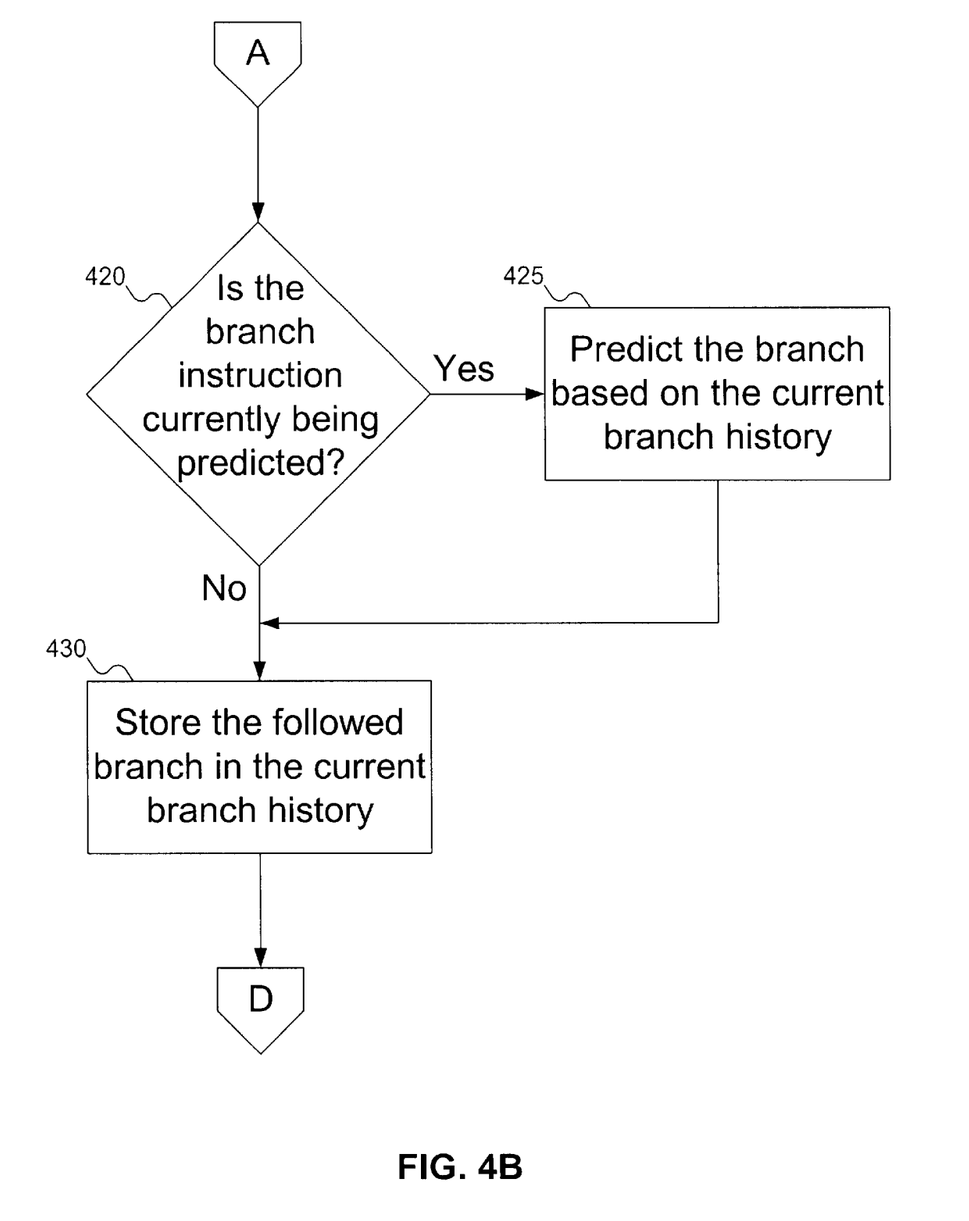
Figure 4C:
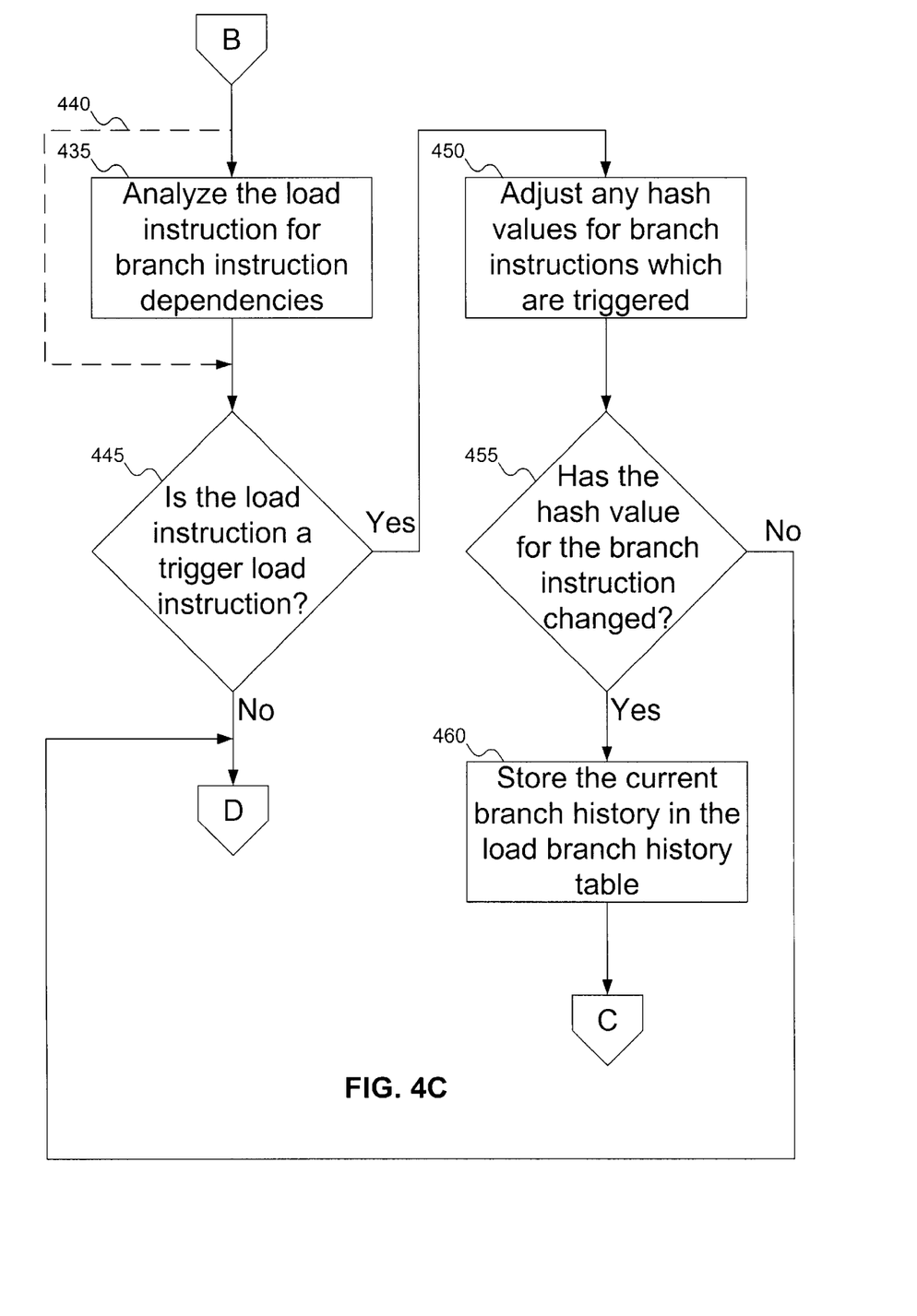
Figure 4D:
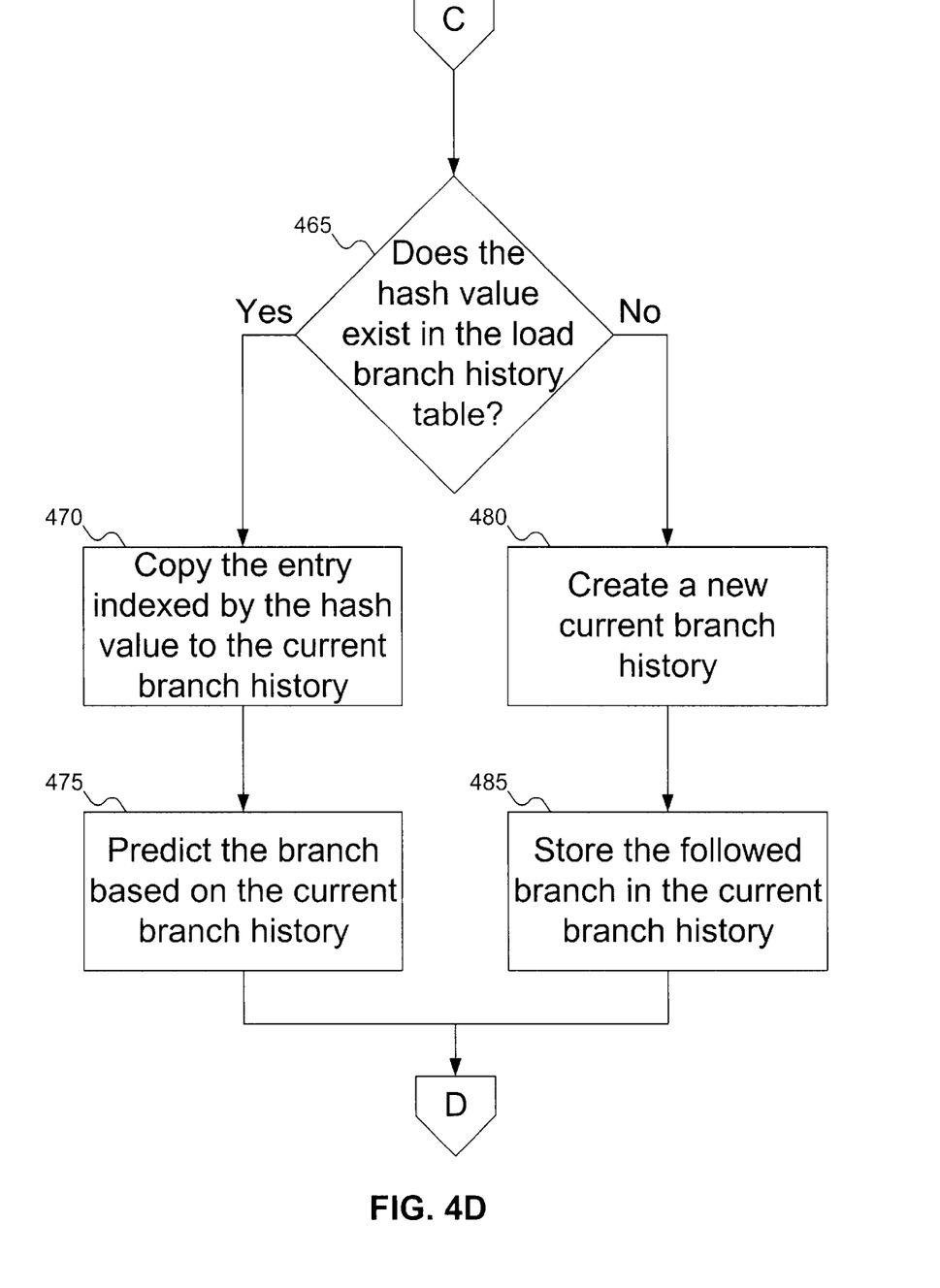

FIG. 3 shows branch prediction apparatus 305 operable on the computer system of FIG. 2. In FIG. 3, load value table 310 stores the load instructions encountered during execution of the program. Each load instruction is indexed by the value of the instruction program counter at the time of the load instruction. For example, entry 315 indicates that load instruction 3 occurred at program counter value 0x00B4.

Active branch table 320 stores the branch instructions encountered during execution of the program. Active branch table 320, like load value table 310, indexes entries by the value of the instruction program counter. Active branch table 320 also tracks the history of branch outcomes for each branch instruction and a hash value of loads feeding each branch instruction. (The use of the hash value will be explained shortly.) For example, entry 325 shows that branch instruction 3, at instruction program counter 0x0122 has been encountered six times, with a branch history of 010010.

Each branch table entry has two hash value-branch history pairs. One hash value-branch history pair stores the previously recorded branch history associated with the previous hash value, and can be used to predict the current branch. The other hash value-branch history pair is the current hash value and accumulates the current branch history in order to predict future instances of the branch.

The branch history may be stored as a binary value, since there are only two choices at each branch instruction. The values "0" and "1" may then be used to represent the paths followed at the branch instruction at each encounter. "0" and "1" may be arbitrarily assigned as either the "right" or "left" path following the branch instruction.

When the outcome of a branch becomes available, load dependency analyzer 345 checks to see on which load instructions, if any, the branch depends. Load dependency analyzer 345 establishes pointers between load value table 310 and active branch table 320. Once established, the pointers will indicate on which loads a branch depends, as well as into which branches a load feeds. For example, in FIG. 3, branch 325 is dependent on load instructions 315 and 330, while load instruction 315 feeds into branch instructions 325 and 360.

One load instruction that feeds into a branch instruction is the last load instruction before the branch instruction. This last load instruction is termed the "trigger load" for that branch instruction. In FIG. 3, the trigger loads are identified with stars. For example, pointer 335 is identified as the trigger load instruction for branch instruction 1. Although only two pointers are shown feeding into branch instructions 1 and 3, a person skilled in the art will recognize that any number of load instructions may feed into a given branch instruction. A person skilled in the art will also recognize that the trigger load may be marked in a different manner: for example, the trigger load for each branch instruction may be stored as part of active branch table 320. Similarly, the trigger load may be cross-referenced to load branch history table 350 (see below).

Now that the cross-reference between load value table 310 and active branch table 320 has been described, the hash value of active branch table can be explained. The hash value stores a hash of the values of all the load instructions that feed into the branch instruction. For example, in FIG. 3, active branch table entry 325 depends on load value table entries 315 and 330. The hash of the most recent values (not shown in FIG. 3) retrieved by load instructions 2 and 3 is 68.

When the outcome of a branch becomes available, and once the pointers between load value table 310 and active branch table 320 are established, a hash of the values of all load instructions that feed into the branch is computed. This value is compared with the current hash value field in the entry for the branch in active branch table 320. If both values match, the branch's outcome is appended to the current branch history field. If there is a mismatch, the current hash value-branch history pair is transferred to load branch history table 350 for future use, and a new branch history corresponding to the new hash value is established.

When a load instruction, such as load instruction 340, completes, it places its value into load value table 310, if it has one. When the trigger load for a branch instruction, such as trigger load 330 for branch instruction 325, is encountered, in addition to placing its value in load value table 310, the hash value of all loads feeding branch 325 is also computed. This new value is compared with the previous hash value field in entry 325 in active branch table 320 for the branch. If the values do not match, then the new hash value is used to access load branch history table 350 to check is a branch history was recorded earlier. If an earlier branch history is found, it is stored in entry 325 of active branch table 320 for the branch. If the new hash value matches the value in the previous hash value field of entry 325 in active branch table 320 for the branch, any history that is in the previous branch history field of entry 325 in active branch table 320 can continue to be used. For example, if the new hash value is 91, then entry 355 may be moved to active branch table 320 for the current branch instruction. The history indexed by hash value 91 shows two "right" branches at the branch instruction, which may be used to predict the next branches taken at the branch instruction.

As with active branch history table 320, load branch history table 350 may also store an identification of the trigger load. As discussed above, load value table 310 may be cross-referenced to load branch history table 350, or load branch history table 350 may store an indicator of the trigger load. This may be useful to avoid having to re-analyze load instructions to identify the trigger load, since trigger loads do not change often during execution of a program.

Active branch table 320 may also retain the most recent previous hash value-branch history pair. The advantage for retaining the previous hash value-branch history pair is that computing a new hash value may involve a latency: the hash value may not be computed before a branch instruction that depends on the hash value. By updating the previous branch history as well as the current branch history, the possibility of latency in computing the hash value is ameliorated: if the previous hash value is still being used, the branch history reflects the chosen path.

In one embodiment, load branch history table 350 uses the hash value of the data retrieved by load instructions feeding into the branch instruction as the index. A match between an index in load branch history table 350 and the new hash value is automatically transferred to the current branch instruction in active branch table 320. In another embodiment, the instruction program counter for the trigger load instruction is also stored in load branch history table 350, to avoid collisions between hash values (for example, if the same load instructions feed into the two different branch instructions). In a third embodiment, a collision is avoided by also hashing the branch instruction program counter into the hash value.

Figure 5:
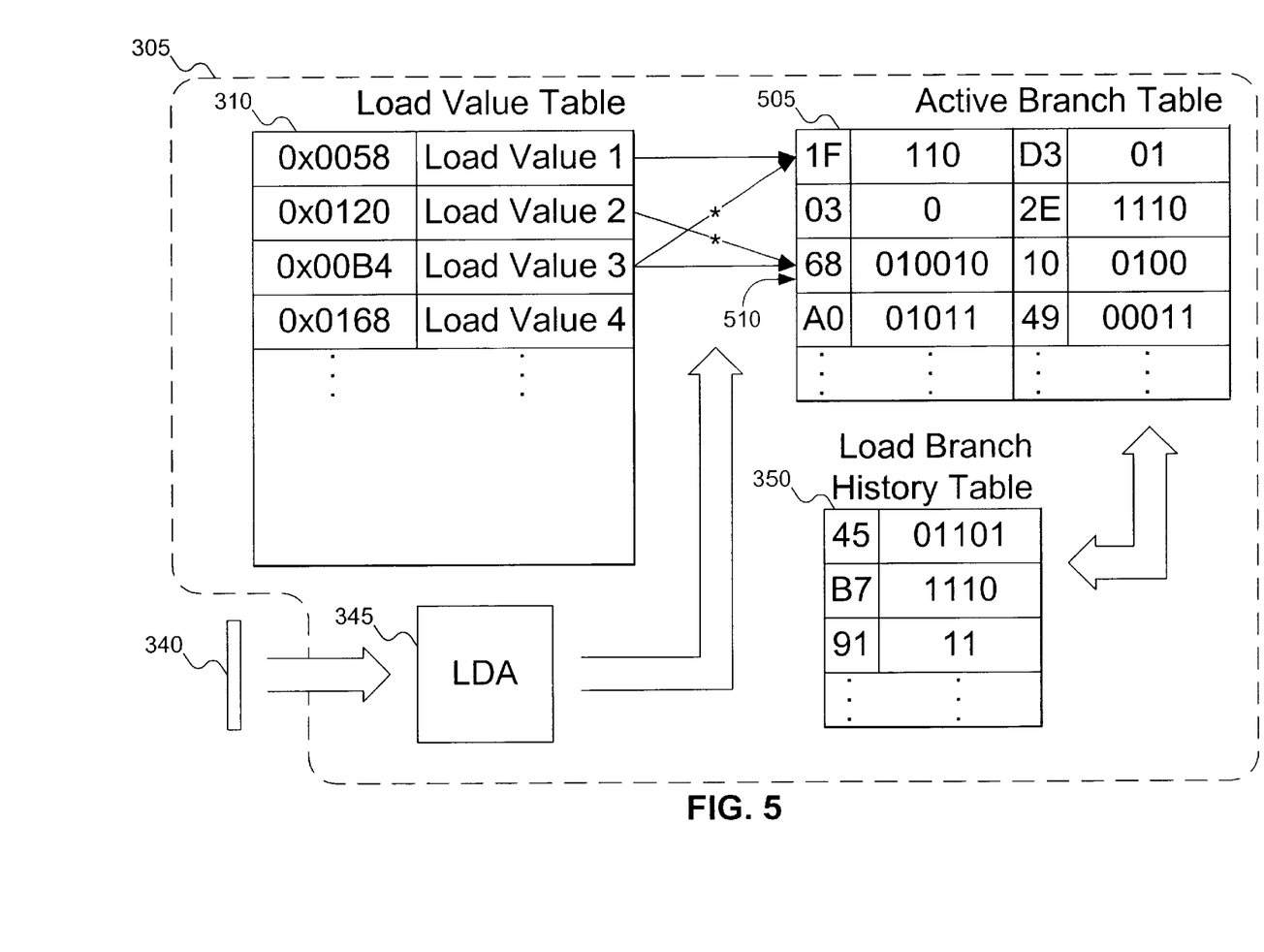
FIG. 5 shows an alternative branch prediction apparatus operable on the computer system of FIG. 2.

FIG. 5 shows a second embodiment of the invention. In FIG. 5, active branch table 505 takes a different form. Whereas in FIG. 3, each entry in active branch table 320 represents a single branch instruction and is indexed by the value of the instruction program counter for the branch instruction, active branch table 505 is indexed by hash values. The principle is that more than one branch instruction may depend on a group of load instructions. Rather than indexing each branch instruction separately, all of the branch instructions index to the hash value of the group of load instruction. Thus, only a single hash value is updated, rather than the hash values of each branch instruction.

As with active branch table 320 of FIG. 3, active branch table 505 of FIG. 5 stores both the current and previous hash value-branch history pairs. This guards against the possibility that the latency in computing the hash value will leave the wrong hash value-branch history pair in active branch table 505. For example, entry 510 stores the hash value-branch history for the group of branch instructions that are fed by load instructions 2 and 3. The current hash value is 68, with its current branch history of 010010; the previous hash value-branch history pair for load instructions 2 and 3 was 10, with a branch history of 0100. Until the hash value for load instructions 2 and 3 changes, both the current and previous branch histories are updated. When the hash value changes, the previous hash value-branch history pair is shifted to load branch history table 350 as before, and the current hash value-branch history pair becomes the previous hash value-branch history pair. Then, either a new hash value-branch history pair is established as the current pair, or a pair is loaded from load branch history table 350, depending on whether the current hash value has been encountered before.

FIGS. 4A–4D show the procedure used by the branch apparatus of FIG. 3 to perform branch prediction. In FIGS. 4A–4D, at block 405, the current instruction is received. At decision point 410, the current instruction is checked to see if it is a branch instruction. If the current instruction is not a branch instruction, then at decision point 415 the current instruction is checked to see if it is a load instruction. If the instruction is neither a branch instruction nor a load instruction, the process returns to block 405 to wait for the next instruction.

If the current instruction is a branch instruction, then at decision point 420 the procedure checks to see if the branch is currently being predicted or its history tracked. If the branch has a previously recorded history, then at block 425 the next choice at the branch is predicted. At block 430, the path followed at the branch instruction is stored in the current branch history. Either way, the procedure then returns to block 405 to wait for the next instruction.

If the current instruction is a load instruction, then at block 435 the load instruction is analyzed to determine any branch instructions that depend from the load instruction. (As shown by dashed line 440, analyzing the load instruction to determine dependent branch instructions may be skipped, especially if the load instruction has previously been analyzed.) At decision point 445, the load instruction is checked to see if it is a trigger for any branch instructions. If the load instruction is not a trigger, then the branch prediction apparatus returns to block 405 and waits for the next instruction.

If the load instruction is a trigger, then at block 450 the hash values of any branches for which the load instruction is a trigger are computed. At decision point 455, the branch prediction apparatus checks to see if the hash values for any branch instructions have changed. If no hash values have changed, then the branch prediction apparatus returns to block 405 to wait for the next instruction. Otherwise, at block 460 the current branch history for any branch instructions whose hash values have changed are stored in the load branch history table.

At decision point 465, the branch prediction apparatus checks to see if the new hash values index any entries in the load branch history table. If an entry indexed by a new hash value exists, then at block 470 the entry is copied into the active branch table, and at block 475 a prediction is made based on the copied branch history. Otherwise, at block 480 a new branch history is created and associated with the new hash value, and at block 485 the chosen branch is stored in the newly created branch history. In either case, the branch prediction apparatus returns to block 405 to wait for the next instruction.

A person skilled in the art will recognize that the embodiments of the invention may not make a prediction the first time a branch is reached. But this is no different from existing branch prediction apparatuses: no prediction may be made until some history is established.

An advantage of the invention is that it improves branch prediction in processors. Empirical studies suggest that, when combined with standard branch predictors, the number of mis-predictions is reduced by up to 75%.

Having illustrated and described the principles of our invention in an embodiment thereof, it should be readily apparent to those skilled in the art that the invention can be modified in arrangement and detail without departing from such principles. We claim all modifications coming within the spirit and scope of the accompanying claims.

We claim:

1. A method for predicting a choice at a branch, the method comprising:
   initializing a branch history for the branch;
   associating a hash value with the branch history;
   determining a trigger load instruction for the branch;
   maintaining the branch history; and
   predicting a next choice at the branch when the trigger load instruction is reached.

2. A method according to claim 1, wherein determining a trigger load instruction includes:
   tracking an instruction sequence; and
   identifying a last load instruction that feeds into the branch as the trigger load instruction.

3. A method according to claim 1, wherein maintaining a branch history includes tracking all choices at the branch since the last execution of the trigger load instruction.

4. A method according to claim 1, wherein determining a trigger load instruction includes determining a plurality of load instructions that feed into the branch.

5. A method according to claim 4, the method further comprising:
   calculating a new hash value when the trigger load instruction is reached, using a hash function operable on the plurality of load instructions that feed into the branch; and
   comparing the new hash value with the associated hash value.

6. A method according to claim 5, wherein comparing the new hash value with the associated hash value includes, if the new hash value differs from the associated hash value, storing the branch history and associated hash value in a branch history table.

7. A method according to claim 6, wherein comparing the new hash value with the associated hash value further includes loading a prior branch history from the branch history table, the prior branch history associated with the new hash value.

8. A method according to claim 5, wherein the hash function includes a shift operation and an exclusive-or operation.

9. A method according to claim 1, wherein predicting a next choice includes predicting a next choice at the branch based on the branch history.

10. An article comprising:
    a storage medium, said storage medium having stored thereon instructions, that, when executed by a computing device, result in:
    initializing a branch history for the branch;
    associating a hash value with the branch history;
    determining a trigger load instruction for the branch;
    maintaining the branch history; and
    predicting a next choice at the branch when the trigger load instruction is reached.

11. An article according to claim 10, wherein determining a trigger load instruction includes:
    tracking an instruction sequence; and
    identifying a last load instruction that feeds into the branch as the trigger load instruction.

12. An article according to claim 10, wherein maintaining a branch history includes tracking all choices at the branch since the last execution of the trigger load instruction.

13. An article according to claim 10, wherein determining a trigger load instruction includes determining a plurality of load instructions that feed into the branch.

14. An article according to claim 13, the storage medium having stored thereon further instructions, that, when executed by the computing device, result in:
    calculating a new hash value when the trigger load instruction is reached, using a hash function operable on the plurality of load instructions that feed into the branch; and
    comparing the new hash value with the associated hash value.

15. An article according to claim 14, wherein comparing the new hash value with the associated hash value includes, if the new hash value differs from the associated hash value, storing the branch history and associated hash value in a branch history table.

16. An article according to claim 15, wherein comparing the new hash value with the associated hash value further includes loading a prior branch history from the branch history table, the prior branch history associated with the new hash value.

17. An article according to claim 14, wherein the hash function includes a shift operation and an exclusive-or operation.

18. An article according to claim 10, wherein predicting a next choice includes predicting a next choice at the branch based on the branch history.

19. A branch prediction apparatus the apparatus comprising:
    a computer including a processor and a memory;
    a load instruction associated with a load instruction address;
    a branch instruction associated with a branch instruction address, a branch history, and a hash value, the branch instruction dependent on the load instruction;
    a pointer from the load instruction to the branch instruction; and
    a branch predictor designed to predict a branch choice based on the load instruction and the branch instruction.

20. An apparatus according to claim 19, the apparatus further comprising a load dependency analyzer designed to analyze the load instruction to determine whether the branch instruction depends on the load instruction.

21. An apparatus according to claim 20, wherein the load dependency analyzer is further designed to establish the pointer from the load instruction to the branch instruction if the branch instruction depends on the load instruction.

22. An apparatus according to claim 19, the apparatus further comprising a load branch history table designed to store the branch history and hash value associated with the branch instruction.

23. An apparatus according to claim 19, the apparatus further comprising a previous hash value and a previous branch history, the previous hash value representing the hash value prior to the execution of the load instruction, and the previous branch history storing the branch history associated with the previous hash value.

24. A branch prediction apparatus, comprising:
   a computer including a processor and a memory;
   a first hash value;
   a first branch history associated with the first hash value;
   a first branch instruction associated with the first hash value and the first branch history;
   a second hash value;
   a second branch history associated with the second hash value;
   a second branch instruction associated with the second hash value and the second branch history; and
   a branch predictor to predict a branch choice at the branch instructions based on the associated hash values and the associated branch histories, in response to the processor executing a trigger load instruction for one of the branch instructions.

25. An apparatus according to claim 24, the apparatus further comprising a previous hash value and a previous branch history, the previous hash value representing the first hash value prior to the execution of a load instruction, and the previous branch history storing the first branch history associated with the previous hash value.

26. An apparatus according to claim 25, wherein the apparatus is adapted to update at least one of the first branch history and the previous branch history with a branch choice at the first branch instruction.

27. An apparatus according to claim 24, wherein the predictor includes:
   a hash value computer to compute a hash value;
   a comparator to compare the computed hash value with the first hash value and second hash value; and
   a predictor to predict the branch choice using the branch history associated with the hash value matching the computed hash value.

28. An apparatus according to claim 27, the apparatus further comprising a load dependency analyzer to analyze a load instruction to determine whether the computed hash value based on the load instruction.

29. An apparatus according to claim 27, wherein the predictor is designed to predict the branch choice at the first branch instruction based on the first hash value and the first branch history if the computed hash value matches the first hash value.

30. An apparatus according to claim 27, wherein the predictor is designed to predict the branch choice at the second branch instruction based on the second hash value and the second branch history if the computed hash value matches the second hash value.

31. A branch prediction apparatus, the apparatus comprising:
   a computer including a processor and a memory;
   a hash value associated with a branch instruction;
   a branch history associated with the hash value;
   at least one branch instruction associated with the hash value and the branch history;
   a previous hash value associated with the branch instruction;
   a previous branch history associated with the previous hash value; and
   a branch predictor to predict a branch choice at the branch instruction based on the associated hash values and the associated branch histories if a computed hash value matches the hash value, in response to the processor executing a trigger load instruction for the branch instruction.

32. An apparatus according to claim 31, wherein the branch prediction apparatus includes at least one branch choice for at least two branch instructions.

33. An apparatus according to claim 31, wherein the branch predictor includes:
   a hash value computer to a computed hash value;
   a comparator to compare the computed hash value with the hash value and second hash value; and
   a predictor to predict the branch choice using the branch history associated with the hash value matching the computed hash value.

34. An apparatus according to claim 33, wherein the predictor is designed to predict the branch choice at the branch instruction based on the hash value and the branch history if the computed hash value matches the hash value.

35. An apparatus according to claim 33, wherein the predictor is designed to predict the branch choice at the branch instruction based on the previous hash value and the previous branch history if the computed hash value matches the previous hash value.

36. An apparatus according to claim 33, the apparatus further comprising a load dependency analyzer to analyze a load instruction to determine whether the computed hash value should be computed based on the load instruction.

37. An apparatus according to claim 31, wherein the apparatus is adapted to update at least one of the branch history and the previous branch history with a branch choice at the branch instruction.

* * * * *

UNITED STATES PATENT AND TRADEMARK OFFICE
CERTIFICATE OF CORRECTION

PATENT NO. : 6,779,108 B2
DATED : August 17, 2004
INVENTOR(S) : Ju et al.

It is certified that error appears in the above-identified patent and that said Letters Patent is hereby corrected as shown below:

<u>Column 7,</u>
Line 45, "wherein the predictor includes:" should read -- wherein the branch predictor includes: --.
Line 56, "hash value based on the load" should read -- hash value should be computed based on the load --.

Signed and Sealed this

Twenty-sixth Day of July, 2005

JON W. DUDAS
*Director of the United States Patent and Trademark Office*